United States Patent
Kobuse et al.

(10) Patent No.: US 11,165,978 B2
(45) Date of Patent: Nov. 2, 2021

(54) IMAGING DEVICE, CONTROL METHOD THEREOF, AND IMAGING APPARATUS

(71) Applicant: CANON KABUSHIKI KAISHA, Tokyo (JP)

(72) Inventors: Takenori Kobuse, Kawasaki (JP); Kentaro Tsukida, Yokohama (JP); Takanori Yamashita, Hachioji (JP); Daisuke Kobayashi, Kawaguchi (JP); Kazuho Tsukui, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/844,365

(22) Filed: Apr. 9, 2020

(65) Prior Publication Data

US 2020/0336681 A1     Oct. 22, 2020

(30) Foreign Application Priority Data

Apr. 16, 2019 (JP) .............................. JP2019-077811
Jan. 10, 2020 (JP) .............................. JP2020-002564
Mar. 17, 2020 (JP) .............................. JP2020-046146

(51) Int. Cl.
*H04N 5/357* (2011.01)
*H04N 5/378* (2011.01)

(52) U.S. Cl.
CPC ............. *H04N 5/357* (2013.01); *H04N 5/378* (2013.01)

(58) Field of Classification Search
CPC ...... H04N 5/357; H04N 5/378; H04N 5/3575; H04N 5/363; H04N 5/355
See application file for complete search history.

(56) References Cited

U.S. PATENT DOCUMENTS

| | | | | |
|---|---|---|---|---|
| 2005/0168602 A1* | 8/2005 | Sumi | .................... | H04N 5/3575 348/294 |
| 2011/0134295 A1* | 6/2011 | Shigeta | ................... | H04N 5/378 348/300 |
| 2016/0050381 A1* | 2/2016 | Onishi | .................... | H04N 5/378 348/300 |

(Continued)

FOREIGN PATENT DOCUMENTS

| JP | 2005175517 A | 6/2005 |
|---|---|---|
| JP | 2016042633 A | 3/2016 |

*Primary Examiner* — Nhan T Tran
(74) *Attorney, Agent, or Firm* — Carter, DeLuca & Farrell LLP

(57) ABSTRACT

In order to provide an imaging device that includes an amplifier performing amplification with a plurality of gains for each signal from a pixel unit and can further reduce a noise component, an imaging device included in an imaging apparatus has the pixel unit in which unit pixels are arranged in a matrix and generates a signal voltage by photoelectric conversion. A column amplifier can amplify a photoelectrically converted signal with a plurality of gains. After an amplified signal is subjected to analog/digital conversion by a column ADC, a signal processing circuit subtracts a noise signal from a pixel signal. A noise signal read out after resetting a floating diffusion section included in the pixel unit and a pixel signal read out immediately thereafter are acquired by being multiplied by a first gain, and a pixel signal read out thereafter is acquired by being multiplied by a second gain. The first gain is set to a value larger than the second gain.

10 Claims, 8 Drawing Sheets

(56) References Cited

U.S. PATENT DOCUMENTS

2018/0054576 A1* 2/2018 Otaka .................. H04N 5/3559
2018/0184018 A1* 6/2018 Itano ..................... H04N 5/355
2020/0336683 A1   10/2020 Kobuse

* cited by examiner

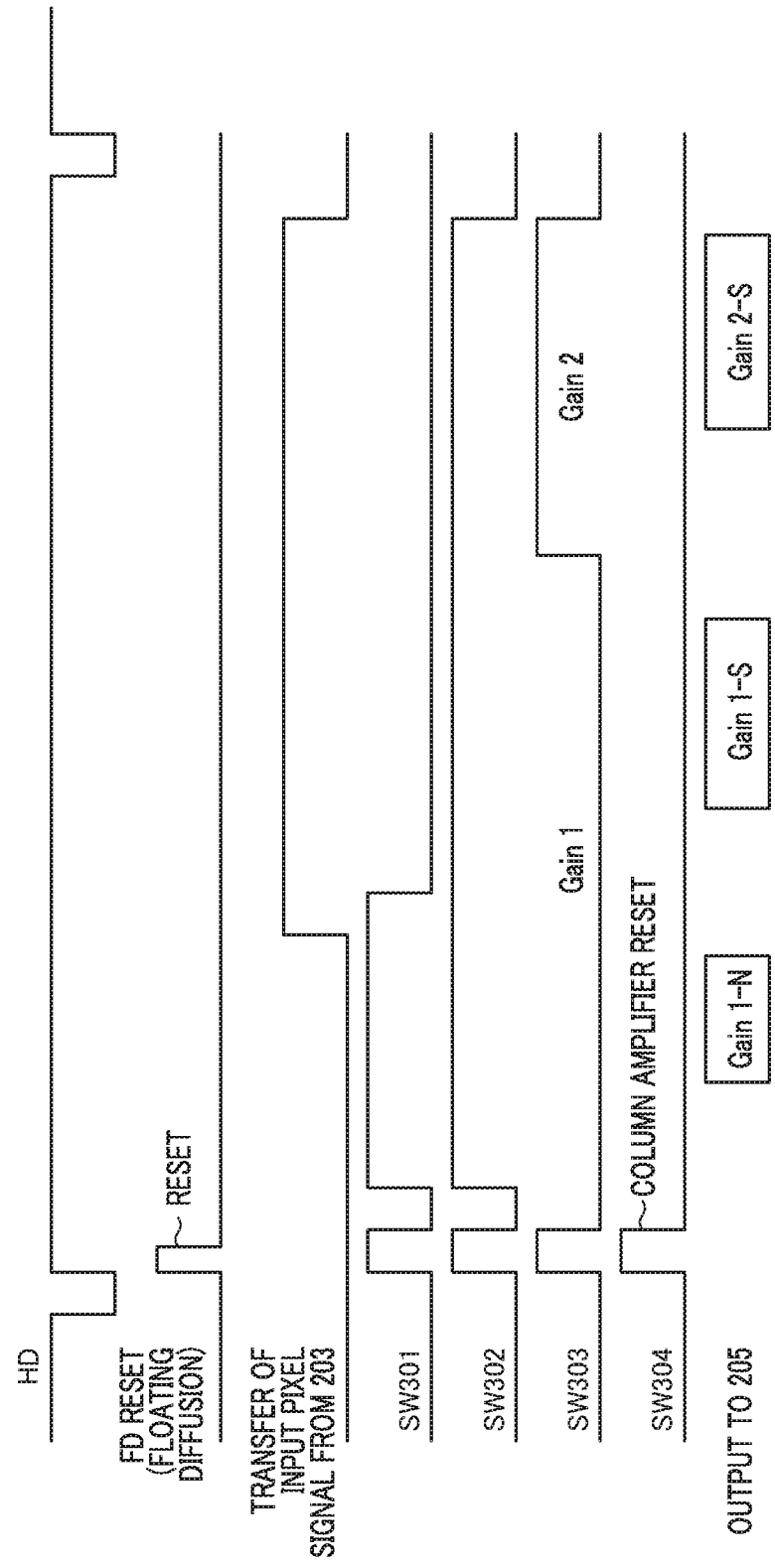

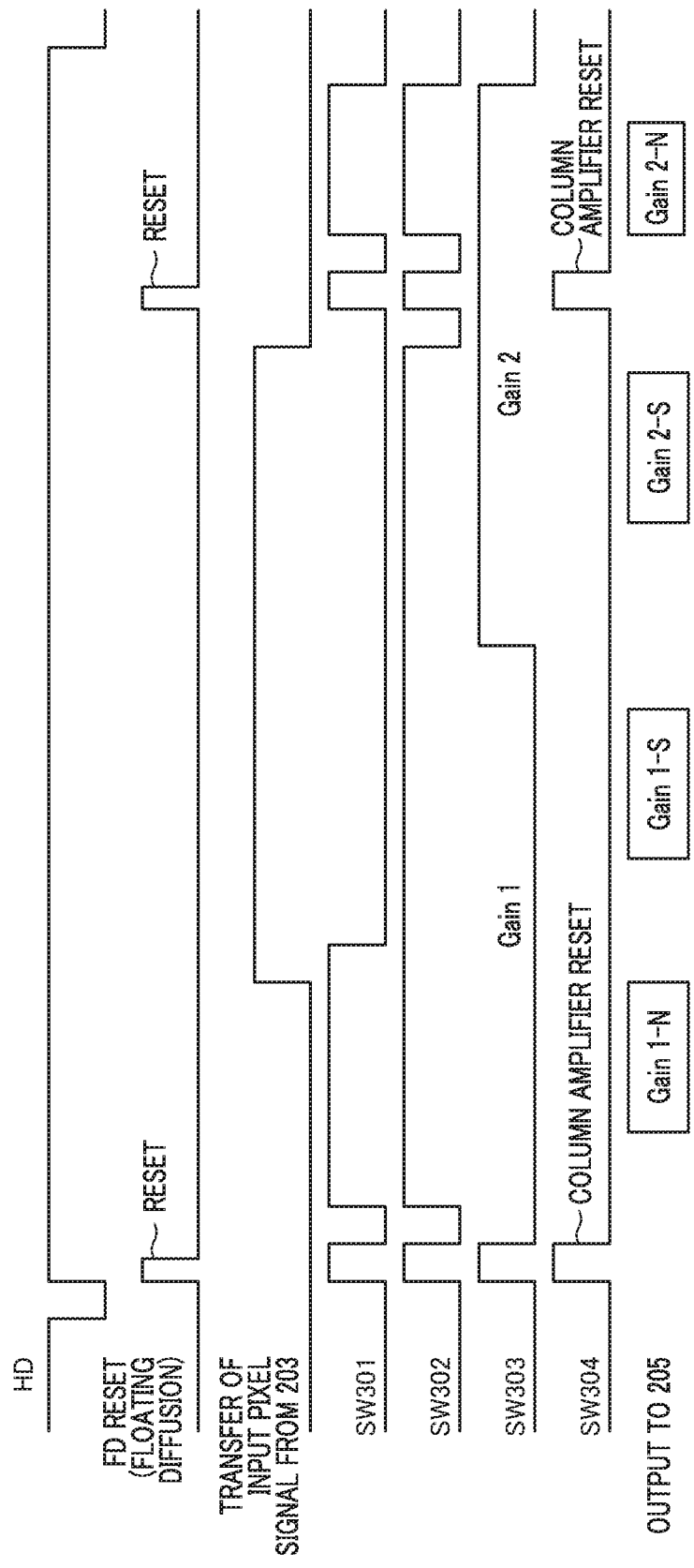

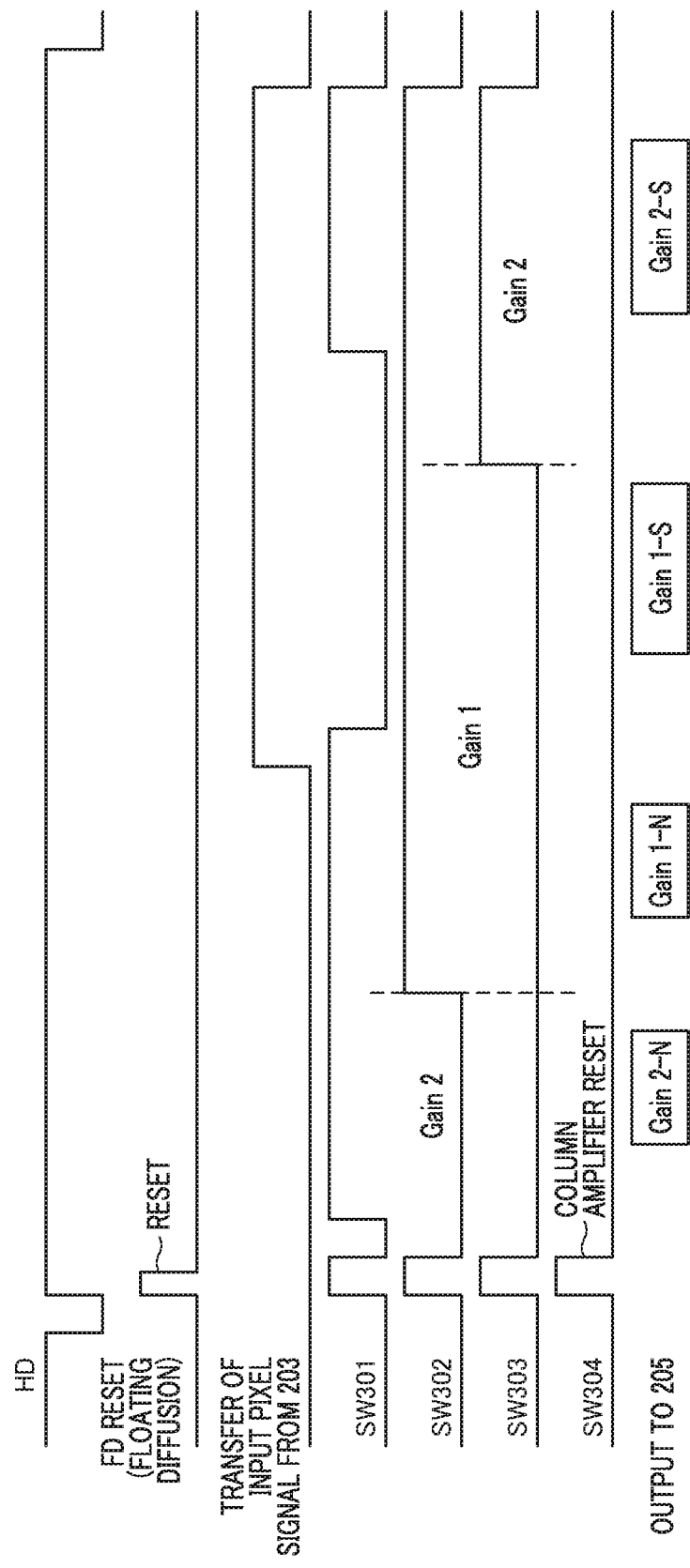

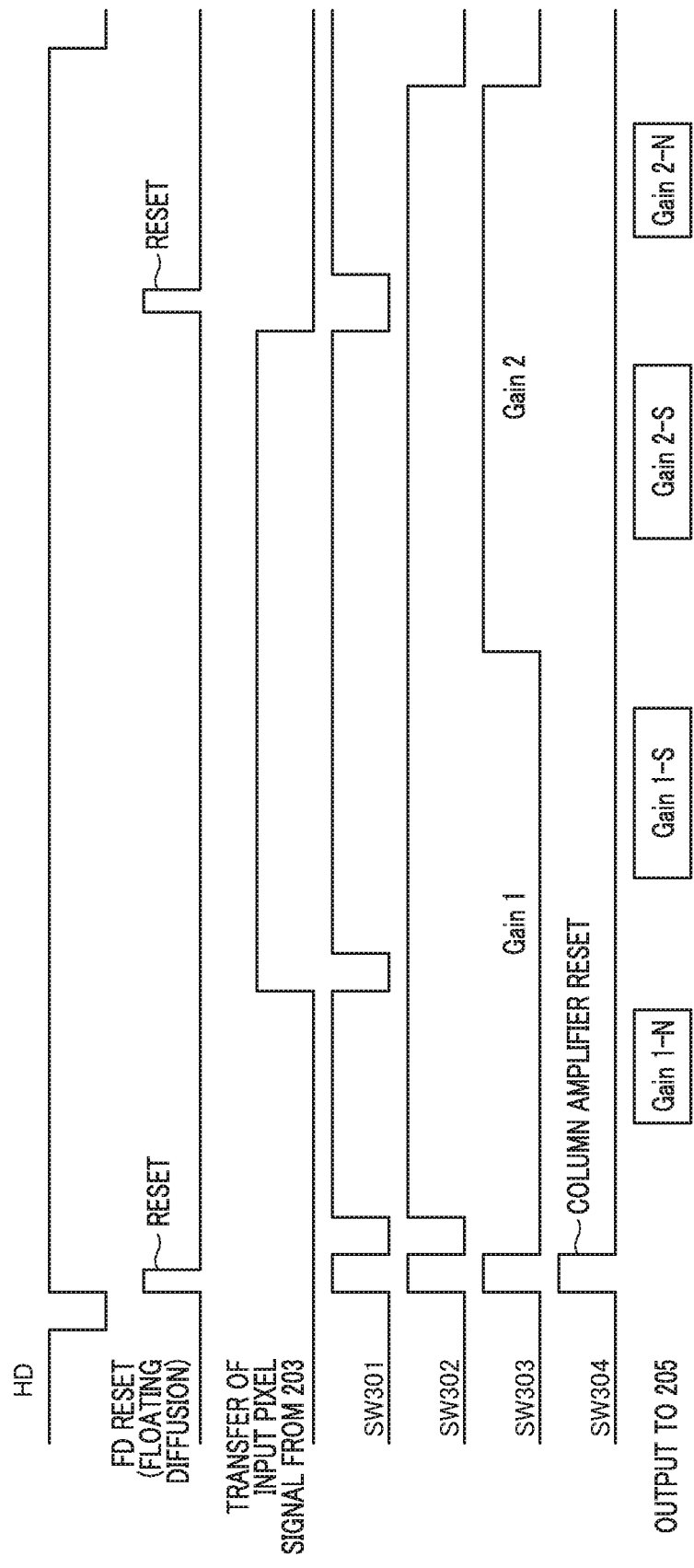

IMAGING DEVICE, CONTROL METHOD THEREOF, AND IMAGING APPARATUS

BACKGROUND OF THE INVENTION

Field of the Invention

The present invention relates to a technology of operation control and signal processing of an imaging device capable of amplifying and reading out a pixel signal with a plurality of gains.

Description of the Related Art

Some imaging apparatuses including a solid-state imaging device have a function of expansion processing of a dynamic range (hereinafter, also denoted as DR) when outputting a video signal that is photoelectrically converted by a pixel unit in which unit pixels are two-dimensionally arranged. An apparatus disclosed in Japanese Patent Laid-Open No. 2005-175517 is able to improve a DR of a video signal by switching a gain of an amplifier in a column circuit with respect to an output signal of a unit pixel and determining a gain so that an output signal is not clipped. FIG. 13 of Japanese Patent Laid-Open No. 2005-175517 discloses a circuit that obtains gains of two types, with two input capacitors of an amplifier, by causing a gain setting unit to determine an input signal level and to change a gain according to the determination result. In a driving method of this case, a noise signal corresponds to only any one of the gains.

Further, in an imaging apparatus disclosed in Japanese Patent Laid-Open No. 2016-042633, it is possible to expand the DR by using a plurality of image signals amplified with different amplification gains according to the amount of incident light. For two images having different amplification gains, synthesis processing is executed by using an image having a larger amplification gain for an image of a low-luminance portion of a subject and using an image having a smaller amplification gain for an image of a high-luminance portion of the subject. In order to read out a noise component with different amplification gains, it is necessary to secure a sufficient number of resets of the pixel unit with respect to the amplification gains.

Incidentally, in an imaging device, a signal reading out method using correlated double sampling is often used. In this method, a noise component is read from a unit pixel at first, then a pixel signal containing the noise component is read, and a process of removing the noise component from the pixel signal in the imaging device is performed. In particular, when a gain of an internal amplification circuit is large, an effect of suppressing noise by correlated double sampling is large.

In the imaging device capable of outputting the same pixel signal with a plurality of gains, when performing synthesis of a plurality of images, if an image to be used for a low-luminance portion is not an image subjected to correlated double sampling, the synthesized image is more likely to become an image in which random noise is conspicuous.

An object of the present invention is to provide an imaging device in which an amplifier performing amplification with a plurality of gains for each signal from a pixel unit is included and a noise component can be further reduced.

SUMMARY OF THE INVENTION

To that end, an aspect of an imaging device of the present invention is as follows.

An imaging device includes
an amplifier that performs amplification with a plurality of gains for each signal from a photoelectric converter of a pixel unit;
a controller that controls a gain of the amplifier; and
a signal processing circuit that subtracts a noise signal from a pixel signal amplified by the amplifier,
wherein the controller performs control to read out a noise signal and a pixel signal with a first gain by the amplifier and then to read out a pixel signal with a second gain by the amplifier, after resetting the pixel unit, and
the first gain is larger than the second gain.

Further features of the present invention will become apparent from the following description of exemplary embodiments (with reference to the attached drawings).

BRIEF DESCRIPTION OF THE DRAWINGS

FIG. 4 is a timing chart illustrating an operation of a column amplifier unit according to a first embodiment.

FIG. 6 is a timing chart illustrating an operation of a column amplifier unit according to a second embodiment.

FIG. 7 is a timing chart illustrating an operation of a column amplifier unit according to a third embodiment.

FIG. 8 is a timing chart illustrating an operation of a column amplifier unit according to a fourth embodiment.

DESCRIPTION OF THE EMBODIMENTS

Hereinafter, embodiments of the present invention will be described with reference to the drawings. The present invention is applicable to an imaging device of a digital single-lens reflex camera, a digital still camera, a digital video camera, or the like. If only a pixel signal is output from a pixel unit of an imaging device, when a black level of a pixel signal (that is, a level approximating noise) is not ascertained, a pedestal level of a video signal cannot be determined. Accordingly, it is difficult to reduce random noise which is discretely generated in the pixel unit and a circuit unit. For example, in signal processing of image synthesis or the like, if the signal is not a signal subjected to correlated double sampling with respect to an image to be used for a low-luminance portion, the synthesized image may become an image in which random noise is conspicuous. In the following embodiments, an imaging device and an imaging apparatus that can further reduce noise and determine a black level and are suitable for DR expansion of an image signal will be described.

First Embodiment

Figure 1:
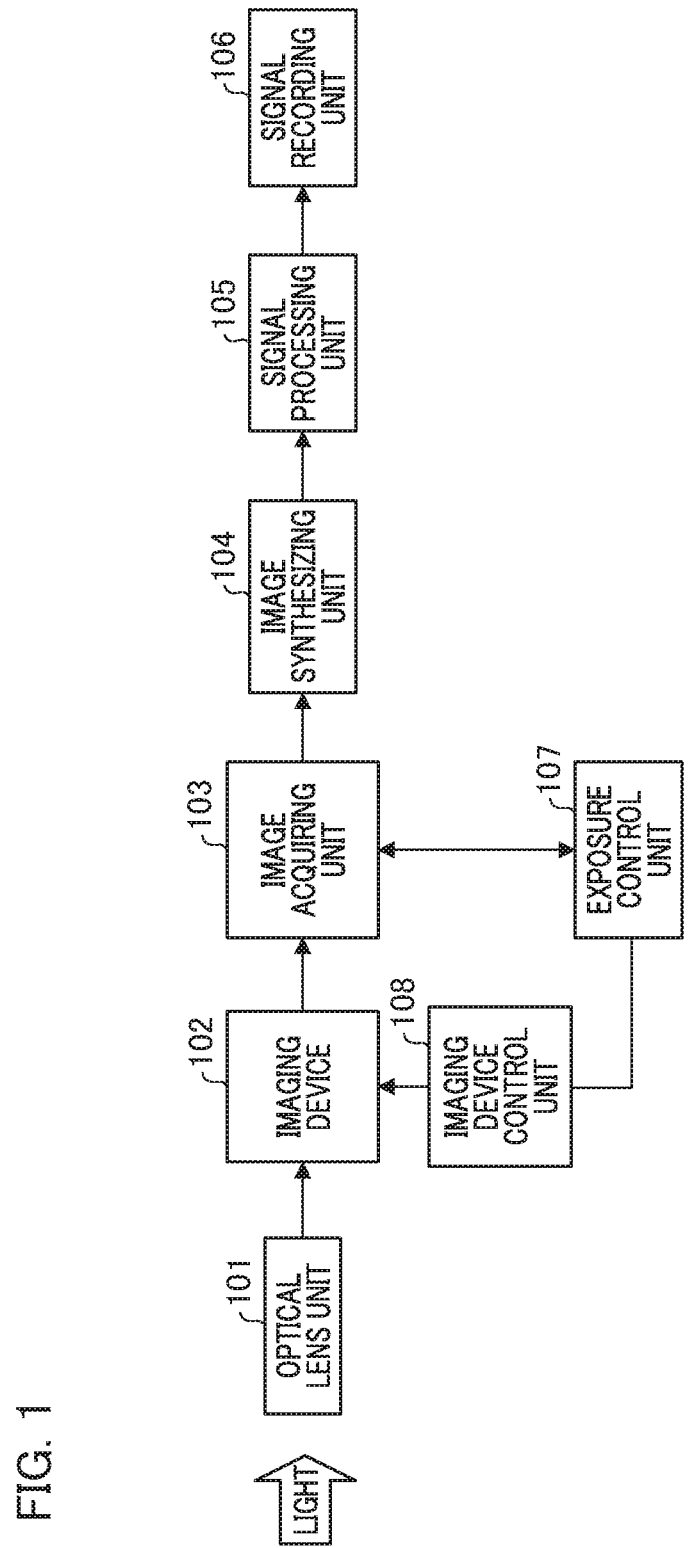
FIG. 1 is a block diagram showing a basic configuration of an imaging apparatus according to an embodiment.

FIG. 1 is a block diagram showing a general configuration of an imaging apparatus 100 according to an embodiment of the present invention. An optical lens unit 101 captures light from a subject and forms an image on a light receiving surface of an imaging device 102. The optical lens unit 101 is an interchangeable lens unit that can be mounted on a main body of the imaging apparatus 100 or a lens unit that is incorporated in the main body, and has an optical member such as a lens and an aperture of an imaging optical system.

The imaging device 102 receives incident light from the optical lens unit 101 and outputs an electrical signal by photoelectric conversion. As representative examples of the imaging device, a charge coupled device (CCD) type image sensor, a complementary metal oxide semiconductor (CMOS) type image sensor, and the like may be enumerated. As the imaging device 102, there are a first type that outputs an analog video signal, and a second type that performs analog/digital (AD) conversion processing inside the imaging device 102 and outputs a digital video signal. As the second type, there is a form in which digital data is output by LVDS (low voltage differential signaling) or the like. A configuration of the imaging device 102 will be described below with reference to FIG. 2.

An image acquiring unit 103 includes a circuit unit that captures a video signal output from the imaging device 102 and performs various kinds of processing. The image acquiring unit 103 performs removal of fixed pattern noise in the imaging device 102, black level clamp processing, and the like. The image acquiring unit 103 also performs processing of separating an image signal to be used for recording a video signal and an evaluation signal for controlling the imaging device 102 from each other. The image acquiring unit 103 includes an internal storage circuit for storing setting values required for processing.

An image synthesizing unit 104 acquires an output of the image acquiring unit 103 and generates a high dynamic range (HDR) image from a signal based on an output of the imaging device 102 by using an arbitrary synthesizing method. For example, there is a method of performing synthesis by using an image acquired with a high gain for a predetermined image portion (normal image) and using an image acquired with a low gain for a brightly overexposed image portion. As the normal image to be used for a signal in a dark portion after the synthesis, it is preferable to be an image in which random noise in the dark portion is suppressed.

A signal processing unit 105 acquires an output of the image synthesizing unit 104 and performs various kinds of image processing such as pixel addition, noise reduction, gamma correction, knee correction, digital gain processing, and flaw correction. The signal processing unit 105 includes an internal storage circuit for storing setting values required for correction and image processing.

A signal recording unit 106 acquires a video signal processed by the signal processing unit 105 and records the signal in a storage device or a storage medium. For example, a memory device that can be mounted on the main body of the imaging apparatus 100 is used.

An exposure control unit 107 calculates an optimum light exposure amount based on video signal information acquired from the image acquiring unit 103. For example, if the imaging device 102 is capable of outputting phase difference information, the exposure control unit 107 can calculate a phase difference from an output of the imaging device 102. If the exposure control unit 107 has a function of focus adjustment control, it is possible to adjust a focus by calculating a defocus amount relating to the imaging optical system with correlation arithmetic operation based on a phase difference and driving a focus lens in the optical lens unit 101. In addition, the exposure control unit 107 determines an operation of an imaging device control unit 108 and transmits a control signal. The imaging device control unit 108 controls an operation of the imaging device 102 according to a control signal from the exposure control unit 107.

Figure 2:
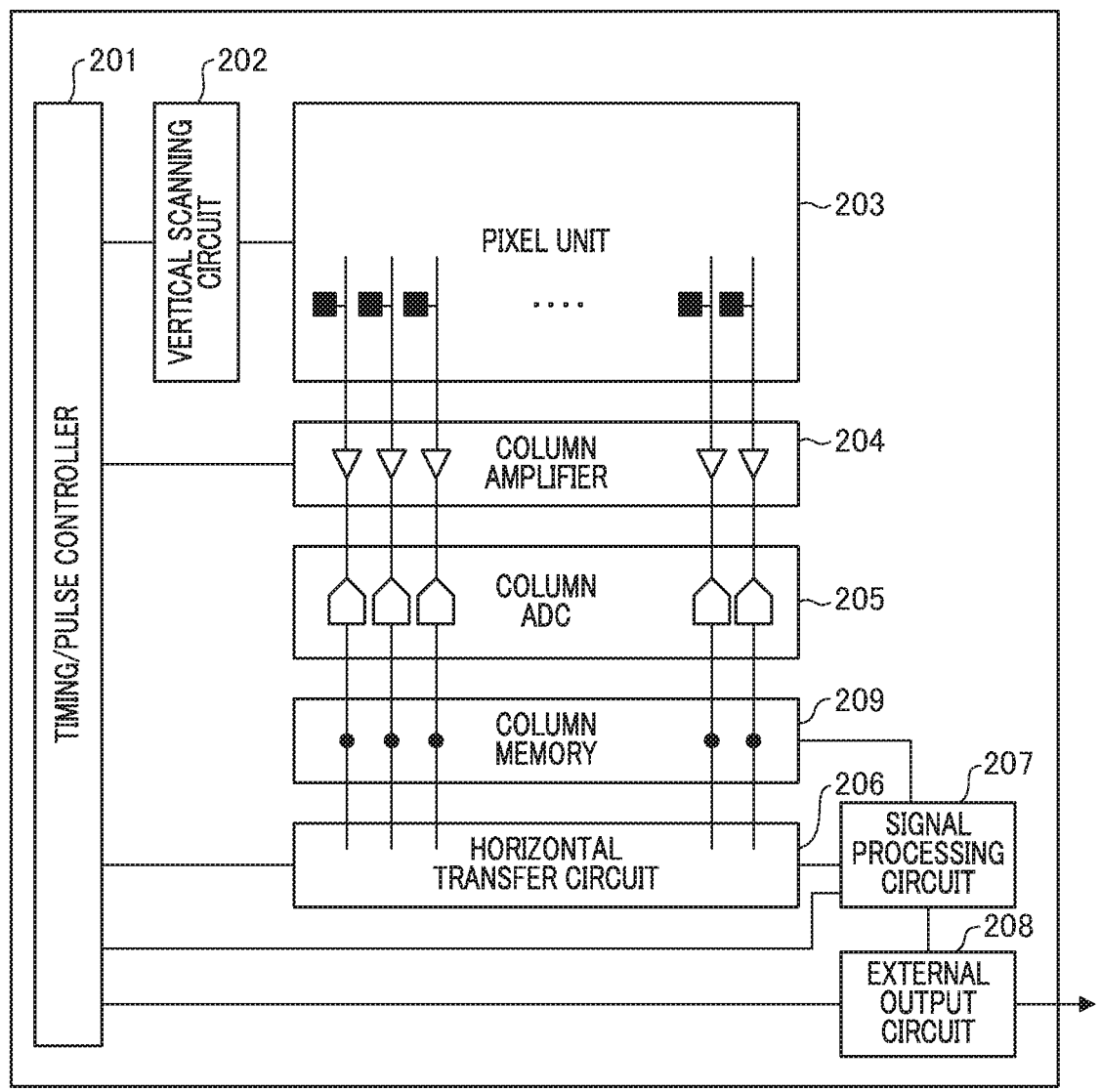
FIG. 2 is a diagram schematically showing an internal configuration of a solid-state imaging device.

A configuration of the imaging device 102 will be described with reference to FIG. 2. FIG. 2 is a block diagram showing an example of the imaging device 102. A timing/pulse controller 201 (controller) controls an operation of the imaging device 102 by supplying an operation clock to each configuration unit of the imaging device 102 and supplying a timing signal to each configuration unit. A vertical scanning circuit 202 performs timing control to sequentially read out pixel signal voltages from a pixel unit 203 in one frame. Generally, video signals are sequentially read out in a row unit from an upper row to a lower row in the pixel unit 203 in one frame.

The pixel unit 203 has a configuration in which many unit pixels are two-dimensionally arranged. Each unit pixel has a single or a plurality of photoelectric converters, and performs photoelectric conversion according to the amount of incident light to output a voltage. A photoelectric conversion device such as a photodiode is used. The pixel unit 203 can also acquire and output phase difference information together with a normal video. For example, there may be a structure in which the photodiode is divided into two for one microlens. The pixel unit 203 includes a transistor that transfers charge to a floating diffusion section, an amplification transistor, and the like in addition to the photoelectric conversion device, but a detailed description of a circuit configuration thereof is omitted because the circuit configuration is publicly known.

A column amplifier 204 (amplifier) electrically amplifies signals read out from the pixel unit 203 for each column. By amplifying signals with the column amplifier 204 provided in a part preceding a column ADC 205, it is possible to improve an S/N ratio (signal to noise ratio) with respect to noise generated in the column ADC 205. In addition, in the column amplifier 204, it is possible to change an amplification gain by a signal from the timing/pulse controller 201. That is, the imaging device 102 can output signals with gains of two types by changing an amplification gain of the column amplifier 204 for generating the HDR image. The column amplifier 204 can output signals obtained by multiplying a signal output from the photoelectric converter at a certain time by two gains, and thus, although the data amount increases, it is possible to acquire two image signals having simultaneity and different gains. A configuration of the column amplifier 204 will be described below.

A column analog/digital converter (ADC) 205 converts an analog signal amplified by the column amplifier 204 into a digital signal. A column memory 209 (memory) is a circuit that temporarily stores an output signal from the pixel, the signal being digitized by the column ADC 205. For example, a noise signal of the pixel is stored in the column memory 209, is transferred to a horizontal transfer circuit 206 at a predetermined timing, and is subjected to processing of correlated double sampling in a signal processing circuit 207. In processing of correlated double sampling, by subtracting a noise component from a pixel signal containing a noise component, a difference between the two is calculated, and only a signal component excluding a noise component is extracted.

The horizontal transfer circuit 206 performs processing of sequentially reading out digital signals temporarily stored in the column memory 209. An output of the horizontal transfer circuit 206 is input to the signal processing circuit 207. The signal processing circuit 207 is a circuit that performs digital signal processing. As digital processing, the signal processing circuit 207 performs correlated double sampling in which a signal of a noise component is subtracted from a read out pixel signal, performs addition of a constant amount which is an offset value, or performs shift arithmetic operation or multiplication. In addition, the signal processing circuit 207 can perform easy gain arithmetic operation. In addition, if the pixel unit 203 is provided with a pixel region that is intentionally shielded from light, a black level clamping operation in digital processing in which the pixel region is used may be performed.

An external output circuit 208 acquires a signal from the signal processing circuit 207 and performs output processing. The external output circuit 208 has a serializer function and converts a multi-bit input parallel signals from the signal processing circuit 207 into serial signals. In addition, the external output circuit 208 converts these serial signals into, for example, LVDS signals or the like and outputs image information to an external device.

Figure 3A:
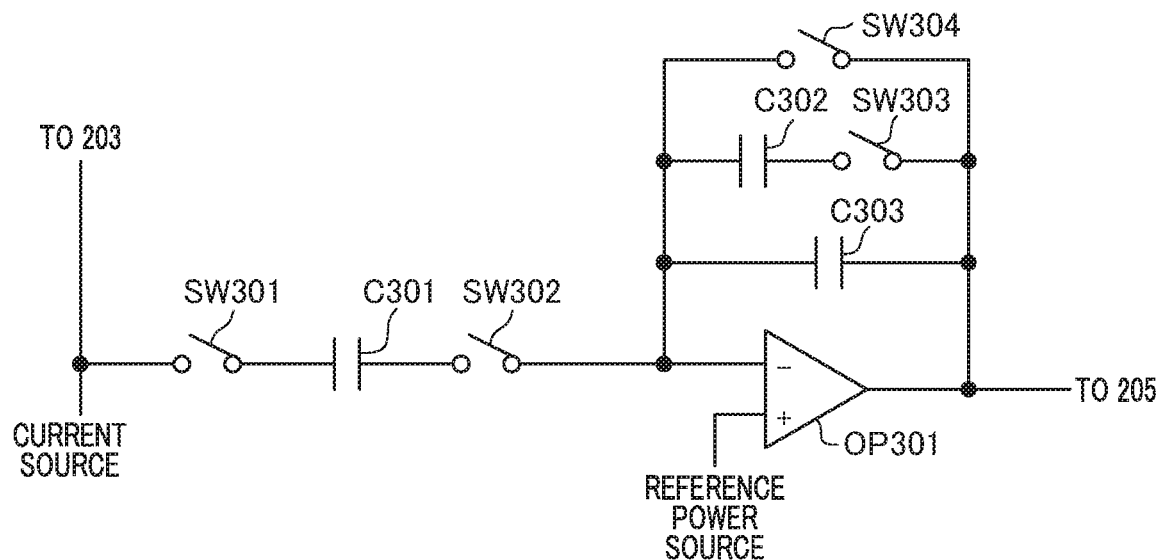
FIGS. 3A and 3B are circuit diagrams each showing a configuration example of a column amplifier unit of the solid-state imaging device.

Next, an operation of the imaging device 102 at the time of generating the HDR image will be described in detail. The imaging device 102 of the present embodiment can output signals by changing the gain of the column amplifier 204 in order to generate the HDR image. A circuit example of the column amplifier 204 and the surroundings thereof at the time of generating the HDR image will be described with reference to FIG. 3A. FIG. 3A is a circuit diagram showing one column extracted from the column amplifier 204. A capacitor is denoted by C, a switch element (transistor or the like) is denoted by SW, and an operational amplifier is denoted by OP. A vertical signal line connected to the pixel unit 203 is connected to a current source, and is shown by a straight line on a left side in FIGS. 3A and 3B.

An input capacitor and a feedback capacitor are connected to OP 301. A voltage of a reference power source is applied to a non-inversion input terminal of OP 301, and an inversion input terminal can be connected to the vertical signal line via SW 302, C301, and SW 301. That is, when SW 301 and SW 302 are turned on, a signal read out from the pixel unit 203 is input to OP 301 via C301 that is an input capacitor.

C302 and C303 are feedback capacitors, and SW 303 can control connection and disconnection of C302. C303 has one end connected to the inversion input terminal of OP 301 and the other end connected to an output terminal of OP 301. C 302 and SW 303 are connected in parallel to C303. C302 and SW 303 are connected in series, and C302 has one end connected to the inversion input terminal of OP 301 and the other end connected to the output terminal of OP 301 via SW 303. SW 304 that is for resetting is connected in parallel to C303, and to C302 and SW 303.

An amplification factor of the column amplifier 204 is determined by a value of a ratio between a capacitance of C301 and a combined capacitance of C302 and C 303 or a capacitance of C303 and is calculated from "input capacitance/feedback capacitance". In FIG. 3A, gains of two types can be obtained by combining two feedback capacitors with respect to one input capacitor. That is, it is possible to output signals of two images obtained by being multiplied by different gains to the column ADC 205 at a subsequent stage.

FIG. 4 is a timing chart illustrating an operation of reading out signals of two images having different gains. HD represents a horizontal synchronization signal. Description will be given focusing on reading out of a certain row of the imaging device 102. A FD (floating diffusion) reset indicates a reset timing of a photoelectric converter (photodiode) and an FD section included in each unit pixel. Below that, a transfer timing of a pixel signal from the pixel unit 203, a state of each switch element, and the output to the column ADC 205 are shown.

The photoelectric converter (photodiode) and the FD section of the pixel to be read out are reset, and all the switch elements of a peripheral circuit of OP 301 are turned on and a resetting operation for discharging a residual charge is performed. Next, by turning on SW 301 and SW 302 in FIG. 3A, processing of reading out a noise component (also referred to as a noise signal) from the pixel unit 203 with Gain 1 that is a first gain is performed. At this time, SW 303 is in a turned-off state. Therefore, if the first gain is expressed as Gain 1, the first gain is determined as follows.

$$\text{Gain 1} = C301/C303$$

A noise signal (denoted as Gain 1-N) amplified with the first gain is output to the column ADC 205.

Next, processing of transferring a pixel signal from the pixel unit 203 to the column amplifier 204 is performed. At this time, by turning on SW 301 and SW 302, first, processing of reading out a pixel signal with Gain 1 that is the first gain is performed. At this time, SW 303 is in a turned-off state. A pixel signal component (denoted as Gain 1-S) amplified with the first gain is output to the column ADC 205. Here, by turning off SW 301, it is possible to reduce variation of a signal level and not affect the analog/digital conversion in the column ADC 205. A pixel signal at this time also contains a noise component.

Next, processing of reading out a pixel signal by turning on SW 303 is performed. At this time, if a second gain is expressed as Gain 2, the second gain is determined as follows.

$$\text{Gain 2} = C301/(C302+C303)$$

A denominator on a right side is a combined capacitance of C302 and C303. Then, a pixel signal component (denoted as Gain 2-S) amplified with the second gain is output to the column ADC 205.

In this example, as a method of reading out two signals having different gains, a state of Gain 1 in which SW 303 is controlled such that it is turned off is generated first, and then a state of Gain 2 in which SW 303 is controlled such that it is turned on is generated. Contrary to the operation of FIG. 4, it is also possible to read out a signal amplified with Gain 2 first. In the present embodiment, when a pixel signal component and a noise component are read out, the gain immediately after the FD reset is set to Gain 1, and the gain thereafter is set to Gain 2. That is, in a state of "Gain 1>Gain 2", noise and a pixel signal are read out with a relatively large gain, and then a pixel signal is read out with a relatively small gain.

Figure 5A:
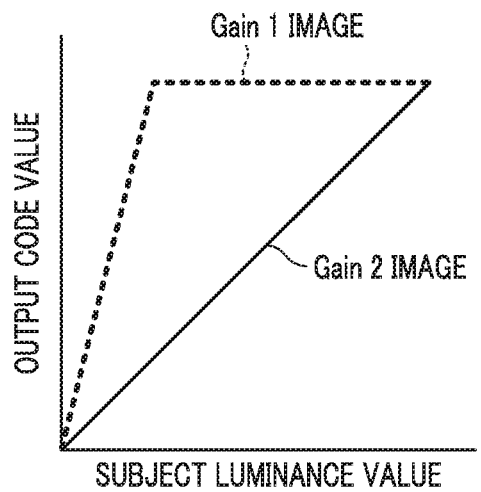
FIGS. 5A, 5B, and 5C are diagrams illustrating image synthesis processing.

Next, an example of a method of synthesizing signals read out with gains of two types will be described with reference to FIGS. 5A, 5B, and 5C, the method being performed by the image synthesizing unit 104. FIG. 5A is a graph in which a horizontal axis denotes a luminance value of the subject and a vertical axis denotes a digital conversion value in the imaging device, that is, an output code value from the imaging device 102. An image based on a signal read out with Gain 1 (hereinafter, referred to as a Gain 1 image) is represented by a dotted polygonal line graph. In addition, an image based on a signal read out with Gain 2 (hereinafter, referred to as a Gain 2 image) is represented by a solid straight line graph.

Since the gains have a relationship of "Gain 1>Gain 2", a gradient of the graph representing the Gain 2 image is smaller than that of the graph representing the Gain 1 image.

On the other hand, in the Gain 1 image, the gain of the column amplifier 204 is large, and thus, at a portion where a luminance of the subject is smaller than that of the Gain 2 image, an output code value reaches a saturation upper limit value (maximum value), but noise of the dark portion is more favorable than that of the Gain 2 image.

Figure 5B:
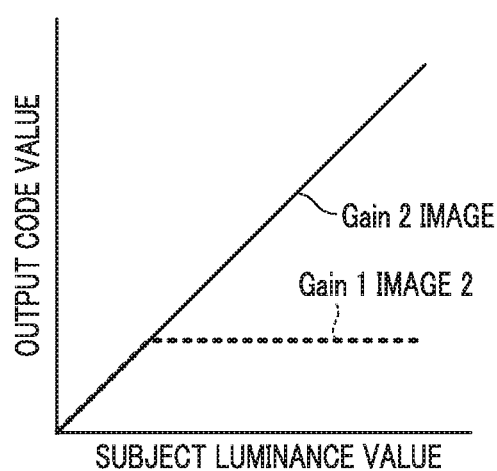

FIG. 5B is a graph for illustrating processing of adjusting a gradient of the graph representing the Gain 1 image to a gradient of the graph representing the Gain 2 image with a digital gain or the like. In FIG. 5B, setting of the horizontal axis and the vertical axis is the same as in FIG. 5A. A graph obtained by performing adjustment processing with respect to the graph representing the Gain 1 image is shown by a dotted polygonal line graph, and the image at this time is referred to as "Gain 1 image 2". In a predetermined region on a low-luminance side, a gradient of a straight line portion of the polygonal line graph matches a gradient of the straight line graph representing the Gain 2 image. In comparison with FIG. 5A, a maximum value of an output code of the Gain 1 image 2 is small.

Figure 5C:
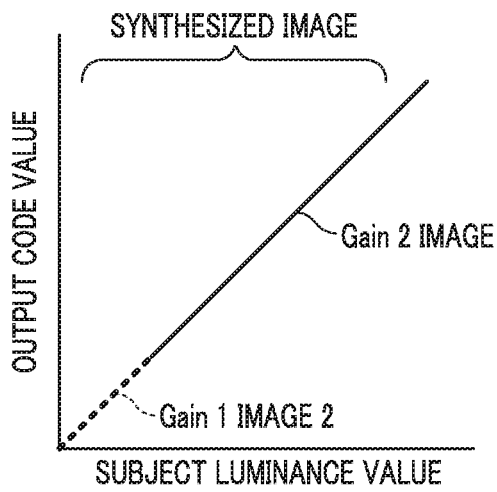

FIG. 5C is a graph for illustrating image synthesis processing, and in FIG. 5C, setting of the horizontal axis and the vertical axis is the same as in FIG. 5A. In the image synthesis, an output code of the Gain 1 image 2 is used up to a saturated portion of the graph representing the Gain 1 image 2 in the region on the low-luminance side (refer to the dotted line). In a region where a luminance is higher than this region (that is, a region where an output code of the Gain 1 image 2 becomes a constant value), an output code of the Gain 2 image is used. That is, DR expansion is performed by generating a synthesized image using the Gain 1 image 2 (an image having little noise) in a dark portion and using the Gain 2 image (including information on the subject having a high luminance) in a bright portion. Note that an image synthesis method shown in FIGS. 5A, 5B, and 5C is an example, and it is possible to implement various methods such as a method of blending two images by switching between the Gain 1 image 2 and the Gain 2 image.

In the present embodiment, the signal processing circuit 207 performs correlated double sampling in which a signal of a noise component having the first gain is subtracted from a pixel signal having the first gain. A value of the first gain to be used when reading out a noise signal and a pixel signal on which such correlated double sampling is performed is set to be larger than a value of the second gain to be used when reading out only a pixel signal. Accordingly, it is possible to reliably improve noise characteristics of a pixel signal having the first gain to be used for a dark portion of an image and to expand a dynamic range. Note that the circuit configuration shown in the present embodiment is an example. Any circuit configuration is possible as long as the same pixel signal can be multiplied by a plurality of gains and output, and there is no limitation to the configuration shown in the present embodiment. For example, there is a method of changing the gain by controlling connection and non-connection of a capacitor additional to the FD section.

Second Embodiment

Next, a second embodiment of the present invention will be described. In the present embodiment, an example will be described in which a noise signal amplified with Gain 2 that is the second gain (hereinafter, denoted as Gain 2-N) is output from the imaging device and is processed outside the imaging device. In the present embodiment, with respect to the same details as those in the first embodiment, the already used reference numerals and symbols are used, the description thereof will be omitted, and differences will be described. Such a method of omitting the description is the same in the embodiment described later.

FIG. 6 is a timing chart illustrating an operation of reading out two S signals multiplied by different gains and Gain 2-N in addition to Gain 1-N. The operation of reading out Gain 1-N, Gain 1-S, and Gain 2-S is the same as in FIG. 4.

In order to read out Gain 2-N after reading out Gain 2-S, the FD reset and a reset of the column amplifier 204 by turning on SW 304 are performed again. After these resets, while SW 303 remains in a turned-on state, the reading out of Gain 2-N is performed.

Thereafter, in the signal processing circuit 207, by subtracting Gain 1-N from Gain 1-S, correlated double sampling of a signal amplified with the first gain is performed. Further, by subtracting Gain 2-N from Gain 2-S, correlated double sampling of a signal amplified with the second gain is performed. Here, in the present embodiment, since the FD reset is performed once before reading out Gain 2-N, strictly speaking, an effect of correlated double sampling cannot be obtained for a signal amplified with the second gain. However, an approximate value of a noise component included in Gain 2-S can be acquired by reading out Gain 2-N, and thus it is effective in processing of adjusting a black level of an image signal, processing of noise removal or reduction, and the like during image synthesis, for example.

As in the present embodiment, even if driving to read out Gain 2-N in a pseudo manner is performed after the reset of the photodiode and the FD section, by setting "Gain 1>Gain 2", it is possible to improve noise characteristics of the dark portion in the synthesized image and to perform DR expansion. Further, when synthesizing the Gain 1 image 2 and the Gain 2 image by reading out Gain 2-N and performing pseudo-correlated double sampling, a black level of the Gain 2 image can be adjusted, which facilitates the synthesis.

According to the present embodiment, a noise signal and a pixel signal can be read out with both the first gain and the second gain by resetting the photodiode and the FD section again.

Third Embodiment

Next, a third embodiment of the present invention will be described. In the present embodiment, an example is shown in which noise signals are each read out by Gain 1 and Gain 2 before a pixel signal is read out.

Figure 3B:
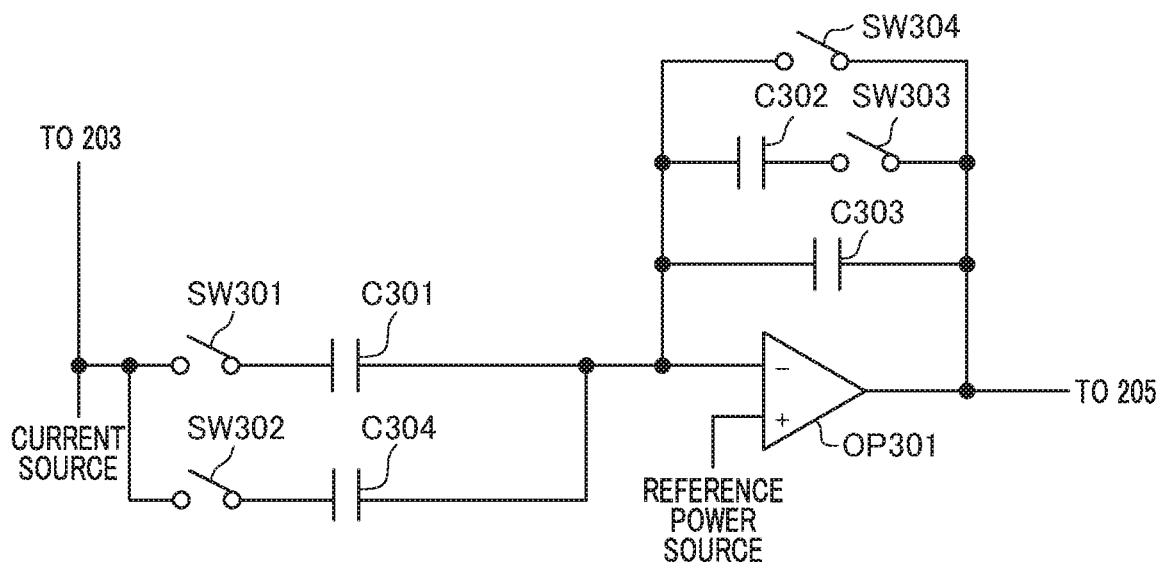

FIG. 3B is a circuit diagram showing one column extracted from the column amplifier 204 according to the present embodiment. In the present embodiment, a switch element SW 302 and an input capacitor C304 are added to the configuration shown in FIG. 3A. That is, at an input stage of OP 301, a series circuit of SW 302 and C304 is connected in parallel to a series circuit of SW 301 and C301.

FIG. 7 is a timing chart illustrating an operation of reading out signals of two images having different gains in the present embodiment. With reference to FIG. 7, processing of reading out a pixel signal (S signal) and a noise signal (N signal) with different gains will be described. First, the photodiode and the FD section of the pixel to be read out are reset, and all the switch elements of a peripheral circuit of OP 301 are turned on and a resetting operation for discharging a residual charge is performed. Thereafter, SW 301 is turned on, and both SW 302 and SW 303 become in a turned-off state. The gain in this state is as follows.

$$\text{Gain } 2 = C301/C303$$

In this state, without performing transfer of a pixel signal from the pixel unit 302, Gain 2-N is read out.

Next, SW 302 is turned on and the gain becomes a state of Gain 1. The gain in this state is as follows.

Gain 1=($C301+C304$)/$C303$

In this state, Gain 1-N is read out.

Subsequently, while remaining the state of Gain 1, transfer of a pixel signal from the pixel unit 203 is performed and Gain 1-S is readout. Next, SW 303 is turned on and the gain becomes a state of Gain 2. The gain in this state is as follows.

Gain 2=($C301+C304$)/($C302+C303$)

In this state, Gain 2-S is read out. In the present embodiment, the capacitances are set such that the gain determined from "C301/C303" is equal to the gain determined from "(C301+C304)/(C302+C303)".

In this way, an N signal and an S signal with Gain 1 and Gain 2 are read out, respectively. In order to perform correlated double sampling, it is necessary to hold Gain 2-N in the column memory 209 until Gain 2-S is read out.

As shown in FIG. 7, the photodiode and the FD section are not reset between Gain 2-N and Gain 2-S, but a period corresponding to the time for reading out Gain 1-N and Gain 1-S is generated. Similar to the second embodiment, it is possible to readout the approximate value of a noise component, it is effective in processing of adjusting a black level of an image signal, processing of noise removal or reduction, and the like during image synthesis.

By setting "Gain 1>Gain 2", it is possible to improve noise characteristics of the dark portion in the synthesized image and to perform DR expansion. Further, when synthesizing the Gain 1 image 2 and the Gain 2 image by reading out Gain 2-N and performing pseudo-correlated double sampling, a black level of the Gain 2 image can be adjusted, which facilitates the synthesis. In the present embodiment, a noise signal and a pixel signal can be read out with both the first gain and the second gain by changing the configuration of the column memory 209 and holding Gain 2-N until Gain 2-S is read out.

In addition to the signal reading out method of the present embodiment, there is a method of performing an FD reset and a reset of a feedback capacitor of the operational amplifier. In this method, charges are held in C301 and C304 after the FD reset, and gains are readout in the order of Gain 1-N and Gain 1-S. Thereafter, the feedback capacitor of OP 301 is reset, and then gains are read out in the order of Gain 2-N and Gain 2-S.

Fourth Embodiment

Next, a fourth embodiment of the present invention will be described. In the present embodiment, similar to the second embodiment, a column amplifier 204 shown in the circuit diagram of FIG. 3A is used. In the second embodiment, if Gain 2-N is read out, the photodiode and the FD section are reset and the column amplifier 204 is reset. On the other hand, in the present embodiment, if Gain 2-N is read out, only the photodiode and the FD section are reset, but the column amplifier 204 is not reset.

FIG. 8 is a timing chart illustrating a reading out operation in the present embodiment. With reference to FIG. 8, processing of reading out a pixel signal (S signal) and a noise signal (N signal) with different gains will be described.

First, the operation up to reading out of Gain 2-S is the same as the operation of the second embodiment shown in FIG. 6, except for the operation of SW 301. In this embodiment, when a pixel signal changes, SW 301 is temporarily turned off. In this manner, by temporarily turning off SW 301 when a pixel signal changes, the influence of the variation of an FD node at the time of the pixel transfer or FD reset can be reduced.

The variation of the FD node is amplified by the column amplifier 204, and greatly vanes an operating point of the column amplifier 204. Then, it takes time to converge a circuit operation of the column amplifier 204, which affects a high-speed operation of the circuit. Note that temporarily turning off SW 301 when a pixel signal changes can be applied to other embodiments.

In order to read out Gain 2-N after reading out Gain 2-S, the photodiode and the FD section are reset once. At this timing, in the present embodiment, unlike the second embodiment, SW 301 is turned off and the column amplifier 204 is not reset. Thereafter, in order to read out a noise component with Gain 2, SW 301 is turned on and Gain 2-N is read out. This will be further described.

At the time of switching the amplification gain of the column amplifier 204 from Gain 1 to Gain 2 by controlling SW 303, noise generated when SW 303 is controlled may be input to an input node of the column amplifier (−input terminal of OP 301). If the amplification gain of the column amplifier 204 is reset and Gain 2-N is read out, an S signal (Gain 2-S) affected by noise of SW 303 and an N signal (Gain 2-N) not affected by noise of SW 303 are read out. Then, correlation between an S signal and an N signal is further broken. If the correlation between an S signal and an N signal is broken, which influences deterioration of an image quality, for example, deterioration of shading in a horizontal direction.

In the present embodiment, Gain 2-N is read out without resetting the amplification gain of the column amplifier 204. In this manner, when Gain 2-N is read out, by not resetting the amplification gain of the column amplifier 204, a noise signal and a pixel signal can be read out without deteriorating the image quality with respect to Gain 1 and Gain 2. Note that at this time, it is desirable that SW 301 be turned off as in the present embodiment.

Note that in the present embodiment, Gain 1 is larger than Gain 2 as in "Gain 1>Gain 2" shown in the above-described embodiment. However, the present invention is not limited to this, and Gain 1 may be smaller than Gain 2.

According to the above-described embodiment, in the imaging device capable of changing a gain of the amplifier and outputting a signal, random noise of an image of the low-luminance portion where noise is generally conspicuous can be reduced and a black level of an image signal can be determined. A dynamic range of a synthesized image signal can be expanded.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-077811, filed on Apr. 16, 2019, Japanese Patent Application No. 2020-002564, filed on Jan. 10, 2020, and Japanese Patent Application No. 2020-046146, filed on Mar. 17, 2020, which are hereby incorporated by reference herein in their entirety.

What is claimed is:

1. An imaging device, comprising:
an amplifier that performs amplification with a plurality of gains for each signal from a photoelectric converter of a pixel unit;
a controller that controls a gain of the amplifier; and
a signal processing circuit that subtracts a noise signal from a pixel signal amplified by the amplifier,
wherein the controller performs control to read out a noise signal with a second gain by the amplifier after resetting the pixel unit and then to read out a noise signal with a first gain by the amplifier, and performs control to read out a pixel signal with the first gain and then to read out a pixel signal with the second gain, and
the first gain is larger than the second gain.

2. The imaging device according to claim 1, further comprising:
a memory that holds a noise signal read with the second gain until a pixel signal is read out with the second gain.

3. An imaging apparatus comprising:
the imaging device according to claim 1.

4. The imaging apparatus according to claim 3, further comprising:
a synthesizing unit that acquires a plurality of signals amplified with different gains by the amplifier and synthesizes images.

5. An imaging device comprising:
an amplifier that performs amplification with a plurality of gains for each signal from a photoelectric converter of a pixel unit;
a controller that controls a gain of the amplifier; and
a signal processing circuit that subtracts a noise signal from a pixel signal amplified by the amplifier,
wherein the controller performs control to read out a noise signal and a pixel signal with a first gain by the amplifier and then to read out a pixel signal with a second gain by the amplifier, after resetting the pixel unit, and performs control to reset the pixel unit again and then to read out a noise signal with the second gain, after reading out a pixel signal with the second gain.

6. The imaging device according to claim 5,
wherein the first gain is larger than the second gain.

7. The imaging device according to claim 5,
wherein the first gain is smaller than the second gain.

8. The imaging device according to claim 5, further comprising:
a switch between the pixel unit and the amplifier,
wherein the switch is turned off when resetting the pixel unit again.

9. A control method of an imaging device, which is executed in the imaging device in which a pixel unit has a photoelectric converter, the method comprising:
controlling a gain of an amplifier that performs amplification with a plurality of gains for each signal from the photoelectric converter of the pixel unit;
performing control to read out a noise signal with a second gain by the amplifier after resetting the pixel unit and then to read out a noise signal with a first gain by the amplifier, and to read out a pixel signal with the first gain and then to read out a pixel signal with the second gain; and
subtracting a noise signal from a read out pixel signal amplified by the amplifier, wherein the first gain is larger than the second gain.

10. A control method of an imaging device, which is executed in the imaging device in which a pixel unit has a photoelectric converter, the method comprising:
controlling a gain of an amplifier that performs amplification for each signal from the photoelectric converter;
performing control to read out a noise signal and a pixel signal with a first gain by the amplifier and then to read out a pixel signal with a second gain by the amplifier, after resetting the pixel unit;
performing control to reset the pixel unit again and then to read out a noise signal with the second gain, after reading out a pixel signal with the second gain; and
subtracting a noise signal from a read out pixel signal.

* * * * *